United States Patent
Koshinz et al.

(10) Patent No.: US 11,243,365 B2
(45) Date of Patent: Feb. 8, 2022

(54) METHODS FOR PROVIDING FLAMMABILITY PROTECTION FOR PLASTIC OPTICAL FIBER

(71) Applicant: The Boeing Company, Chicago, IL (US)

(72) Inventors: Dennis G. Koshinz, Bellevue, WA (US); Eric Y. Chan, Mercer Island, WA (US); Tuong K. Truong, Bellevue, WA (US); Henry B. Pang, Mercer Island, WA (US); Kim Quan Anh Nguyen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/193,699

(22) Filed: Nov. 16, 2018

(65) Prior Publication Data
US 2020/0158972 A1   May 21, 2020

(51) Int. Cl.
*G02B 6/44* (2006.01)
*G02B 6/42* (2006.01)
(Continued)

(52) U.S. Cl.
CPC ......... *G02B 6/4436* (2013.01); *G02B 6/4256* (2013.01); *G02B 6/443* (2013.01);
(Continued)

(58) Field of Classification Search
CPC .... G02B 6/4436; G02B 6/4486; G02B 6/443; G02B 6/4256; H04B 10/801; H04Q 11/0071
See application file for complete search history.

(56) References Cited

U.S. PATENT DOCUMENTS 4,948,222 A * 8/1990 Corke ................. G02B 6/3889
  385/100
5,035,480 A * 7/1991 Dutt .................... G02B 6/2808
  385/24
(Continued)

FOREIGN PATENT DOCUMENTS

EP   1174746 A1   1/2002
GB   1565724 A    4/1980

OTHER PUBLICATIONS

Extended European Search Report dated Mar. 2, 2020 in European Patent Application No. 19194284.6 (European counterpart of the instant U.S. patent application).
(Continued)

*Primary Examiner* — Thomas A Hollweg
*Assistant Examiner* — Mary A El-Shammaa
(74) *Attorney, Agent, or Firm* — Ostrager Chong Flaherty & Broitman P.C.

(57) ABSTRACT

Methods for providing flammability protection for plastic optical fiber (POF) embedded inside avionics line replaceable units (LRUs) or other equipment used in airborne vehicles such as commercial or fighter aircrafts. A thin and flexible flammability protection tube is placed around the POF. In one proposed implementation, a very thin (100 to 250 microns in wall thickness) polyimide tube is placed outside and around the POF cable embedded inside an LRU or other equipment. The thin-walled polyimide tube does not diminish the flexibility of the POF cable.

16 Claims, 6 Drawing Sheets

(51) Int. Cl.
  *H04B 10/80* (2013.01)
  *H04Q 11/00* (2006.01)
(52) U.S. Cl.
  CPC ......... *G02B 6/4486* (2013.01); *H04B 10/801* (2013.01); *H04Q 11/0071* (2013.01); *H04B 2210/003* (2013.01); *H04Q 2011/0094* (2013.01); *H04Q 2213/1301* (2013.01)

(56) References Cited

U.S. PATENT DOCUMENTS

| | | | | |
|---|---|---|---|---|
| 5,222,180 | A * | 6/1993 | Kuder | G02B 6/04 |
| | | | | 385/115 |
| 5,343,544 | A * | 8/1994 | Boyd | B29D 11/0075 |
| | | | | 385/46 |
| 5,394,490 | A * | 2/1995 | Kato | G02B 6/13 |
| | | | | 257/432 |
| 5,642,450 | A * | 6/1997 | Oda | G02B 6/3825 |
| | | | | 385/60 |
| 6,398,120 | B1 | 6/2002 | Li | |
| 6,398,190 | B1 * | 6/2002 | Li | G02B 6/4459 |
| | | | | 254/134.3 FT |
| 7,965,913 | B2 | 6/2011 | Chan et al. | |
| 8,554,032 | B2 | 10/2013 | Koshinz et al. | |
| 8,729,900 | B1 * | 5/2014 | Dunn | G01V 3/08 |
| | | | | 324/326 |
| 9,778,419 | B1 | 10/2017 | Chan et al. | |
| 9,791,644 | B2 | 10/2017 | Chan et al. | |
| 10,012,793 | B2 | 7/2018 | Chan et al. | |
| 10,429,517 | B1 * | 10/2019 | Isham | G01T 1/161 |
| 2002/0097966 | A1 * | 7/2002 | Zelesnik | F16L 9/19 |
| | | | | 385/100 |
| 2003/0044136 | A1 | 3/2003 | Nakamura et al. | |
| 2004/0001682 | A1 | 1/2004 | Beuth et al. | |
| 2004/0109650 | A1 * | 6/2004 | Kim | G02B 6/4483 |
| | | | | 385/100 |
| 2005/0259935 | A1 * | 11/2005 | Hamada | G02F 1/3136 |
| | | | | 385/129 |
| 2006/0188203 | A1 | 8/2006 | Mitsuishi et al. | |
| 2008/0124508 | A1 * | 5/2008 | Sato | G02B 6/02038 |
| | | | | 428/38 |
| 2008/0277810 | A1 * | 11/2008 | Sato | B29D 11/00721 |
| | | | | 264/1.29 |
| 2009/0226177 | A1 * | 9/2009 | Woosnam | H04B 10/2575 |
| | | | | 398/115 |
| 2011/0110630 | A1 * | 5/2011 | Hashimoto | G02B 6/3858 |
| | | | | 385/85 |
| 2011/0243566 | A1 * | 10/2011 | Truong | H04B 10/40 |
| | | | | 398/116 |
| 2012/0027415 | A1 | 2/2012 | Chan et al. | |
| 2014/0344496 | A1 * | 11/2014 | Chan | H04B 10/278 |
| | | | | 710/305 |
| 2017/0357069 | A1 * | 12/2017 | Messer | G02B 6/4402 |
| 2018/0302165 | A1 * | 10/2018 | Truong | H04B 10/278 |
| 2020/0057203 | A1 * | 2/2020 | Koshinz | G02B 6/3802 |
| 2020/0158972 | A1 * | 5/2020 | Koshinz | G02B 6/4486 |

OTHER PUBLICATIONS http://paramounttube.com/kapton-tube-polyimide-tubing/.
http://www.microlumen.com/medical-tubing/polyimide-tubing.
ESKA(TM) Polyethylene Jacketed Optical Fiber Cord: BH40001 Datasheet, Mitsubishi Rayon Co., Ltd.
European Examination Report dated Apr. 30, 2021 in European Patent Application No. 19194284.6 (European counterpart of the instant U.S. patent application).

\* cited by examiner

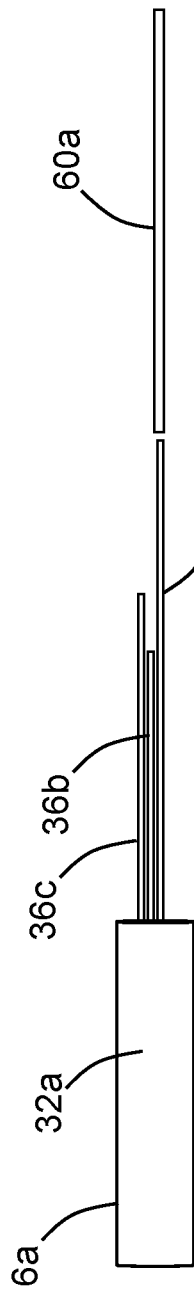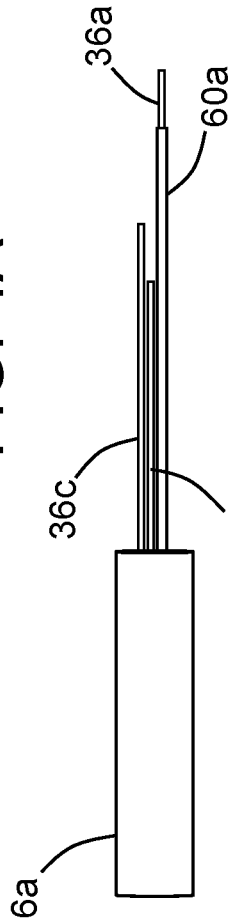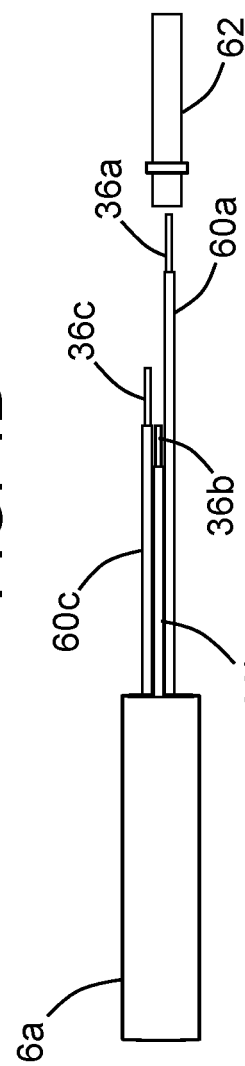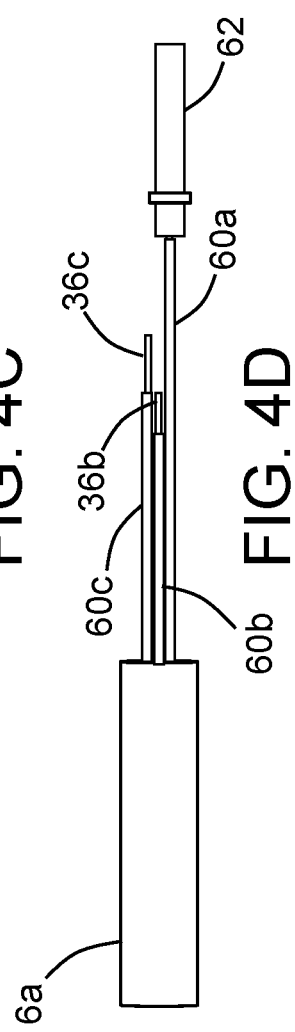

METHODS FOR PROVIDING FLAMMABILITY PROTECTION FOR PLASTIC OPTICAL FIBER

BACKGROUND

The technology disclosed herein generally relates to optical networks that enable communication between electrical components and, more particularly, relates to methods for providing flammability protection for components of such optical networks.

ARINC 629 is a multi-transmitter, shared-bus protocol used for aeronautical and aviation communications networks. Existing optical fiber designs for ARINC 629 require major modification and recertification of the line replaceable units (LRUs) with the introduction of fiber optic components that may be used to reduce weight, volume and installation effort, such as transmit and receive fiber optic serial interface modules and changes in the LRU connector to accommodate optical fiber.

As used herein, the term "line replaceable unit" refers to a modular component of an aircraft, ship or spacecraft (or any other manufactured device) that is designed to be replaced quickly at an operating location. Typically, an LRU comprises an assembly of optical, electrical and optical-electrical devices contained within a housing which is easily transportable.

One example of an LRU employed onboard an aircraft is a plastic optical fiber converter (hereinafter "POFC") that facilitates communications between other operational LRUs. The POFC has a modular housing containing an array of optical-electrical media converters that convert electrical signals (e.g., electrical signals formatted in accordance with the ARINC 629 protocol) from each system LRU into optical signals that can communicate on an optical network using plastic optical fiber (POF).

The POFC system is intended to replace current mode couplers, coupler integration panels, and electrical data bus cables with optical media converters, optical star couplers, and plastic optical fiber for size, weight and power savings and increased reliability. The POFC maintains the ARINC 629 end-to-end communication protocol and interfaces between LRUs. The conversion to plastic optical fiber is completely transparent to the system LRUs and enables the reuse of existing ARINC 629 equipment onboard an aircraft. A plastic optical fiber converter incorporated in an avionics system that complies with the ARINC 629 protocol may be referred to as an "ARINC 629 plastic optical fiber converter".

Currently, the POFC system includes an individually packaged optical-electrical media converter for each channel. The POFC system also includes individually packaged optical star couplers. These individually packaged units are interconnected together by fully jacketed POF cables.

As used herein, the term "star coupler" means a device of a type that receives a plurality of optical signals at an input face via respective input optical fibers and outputs respective portions of each received optical signal to each of a plurality of output optical fibers optically coupled to an output face of the device. Thus each output optical fiber receives respective input optical signals from all of the input optical fibers. In the POFC system, one star coupler is optically coupled to the transmitters and another star coupler is optically coupled to the receivers of a plurality of optical-electrical media converters to enable a plurality of electronic components (such as LRUs), which are respectively electrically connected to the optical-electrical media converters, to communicate with each other.

One proposed implementation of a POFC has a pair of POF star couplers housed inside a fully enclosed metal box, each star coupler comprising a tapered optical mixer housed in a holding tube. The optical mixers are optically coupled to a multiplicity of POF cables (e.g., having PMMA cores) which must comply with flammability standards. The POF cables are installed close to the electronic printed circuit boards (PCBs) of the optical-electrical media converters incorporated in the POFC.

In general, optical fiber used in commercial aircraft is protected by a thick and heavy cable jacket made of a certified material. However, incorporating certified heavy and thick protection jackets in the POF jumpers for the star couplers inside the POFC is not feasible because of size and cost limitations. Besides, embedding the POF jumpers with the thick and bulky cable jacket would make the POF cables too rigid and inflexible to make optical connections to the transmitter and receiver inside the POFC.

The problem is to ensure adequate flammability protection for POF embedded inside avionics LRUs or other equipment used onboard airborne vehicles while avoiding one or more of the difficulties mentioned above.

SUMMARY

The subject matter disclosed in some detail below is directed to methods for providing flammability protection for plastic optical fiber (POF) embedded inside avionics line replaceable units (LRUs) or other equipment used in airborne vehicles such as commercial or fighter aircrafts. Standard commercial-off-the-shelf POF does not have a flame-resistant outer jacket for protection of the POF from burning. For example, one commercially available POF (PMMA core/fluorinated polymer cladding) has a jacket made of polyethylene. In addition, for POF components used inside an electronic LRU which has limited space for the POF components, the POF components need to be compact and slim.

In accordance with the embodiments of a flammability protection process disclosed herein, a thin and flexible flammability protection tube is placed around POF installed (embedded) inside an electronic LRU or other equipment. In one proposed implementation, a very thin (100 to 250 microns in wall thickness) polyimide tube is placed outside and around the embedded POF cable. The thin-walled polyimide tube does not diminish the flexibility of the POF cable. Such polyimide tubing is a low-cost solution to protect the POF cables inside the POFC from burning. Moreover, the fabrication process proposed herein does not affect the optical performance of the POFC; key POFC metrics such as transmitter output power, receiver sensitivity and optical link margin will not be affected by the proposed process.

Although various proposed embodiments of methods and devices for providing embedded POF with flammability protection will be described in some detail below, one or more of those proposed embodiments may be characterized by one or more of the following aspects.

One aspect of the subject matter disclosed in detail below is a system comprising: a star coupler; a plastic optical fiber cable comprising a plastic optical fiber optically coupled to the star coupler and a jacket that ensheathes the plastic optical fiber, the jacket being disposed adjacent to the star coupler; a protection tube that ensheathes the jacket of the plastic optical fiber cable in an area adjacent to the star coupler; and a connector attached to the plastic optical fiber cable. The protection tube is made of a flame-resistant material (e.g., polyimide). In accordance with some embodiments, the protection tube is flexible and has a wall thickness of between 100 and 250 microns. The system may further comprise: an optical-electrical media converter that is optically coupled to the star coupler by way of the plastic optical fiber cable; and a line replaceable unit that is electrically coupled to the optical-electrical media converter.

Another aspect of the subject matter disclosed in detail below is a method for providing flammability protection to plastic optical fiber, the method comprising: cutting a specified length of tubing made of flame-resistant material to form a protection tube; sliding the protection tube onto a plastic optical fiber cable; sliding a connector onto one end of the plastic optical fiber cable; and attaching the connector to the one end of the plastic optical fiber cable.

In accordance with some embodiments of the method described in the immediately preceding paragraph, the connector is attached to the one end of the plastic optical fiber cable by crimping. The connector may also be crimped onto the protection tube.

The method may further comprise: optically coupling another end of the plastic optical fiber cable to a star coupler; placing an optical-electrical media converter having a receptacle inside a housing of a modular unit; placing the star coupler, plastic optical fiber cable and connector inside the housing; plugging the connector into the receptacle to optically couple the star coupler to the optical-electrical media converter; closing the housing of the modular unit after the optical-electrical media converter, star coupler, plastic optical fiber cable and connector have been placed inside; and installing the modular unit in an avionics system onboard an aircraft.

A further aspect of the subject matter disclosed in detail below is a modular component comprising: a housing; an optical-electrical media converter installed inside the housing, the optical-electrical media converter comprising a receptacle; a star coupler installed inside the housing; a plastic optical fiber cable comprising a plastic optical fiber and a jacket that ensheathes the plastic optical fiber, the plastic optical fiber being connected to optically couple the star coupler to the optical-electrical media converter inside the housing; a connector attached to one end of the plastic optical fiber cable and mechanically coupled to the receptacle of the optical-electrical media converter; and a protection tube that ensheathes the jacket of the plastic optical fiber cable, wherein the protection tube is made of a flame-resistant material (e.g., polyimide).

Other aspects of methods and devices for providing embedded POF with flammability protection are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale and the relative thicknesses of layers or parts depicted in those diagrams does not precisely reflect the actual thicknesses.

FIGS. 4A through 4D are diagrams representing respective side views of three POF cables connected to a star coupler at respective stages of a process for providing flammability protection to the POF cables in accordance with one embodiment.

Reference will hereinafter be made to the drawings in which similar elements in different drawings bear the same reference numerals.

DETAILED DESCRIPTION

Illustrative embodiments of an avionics system comprising modular units configured to enable various avionics electrical devices to communicate via an optical network are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Various embodiments of a fiber optical network for enabling optical communication between line replaceable units on an aircraft will be described in detail below for the purpose of illustration. However, implementation of the fiber optical networks disclosed herein is not limited solely to the environment of an aircraft, but rather may be utilized in fiber optical networks onboard other types of vehicles or fiber optic networks.

It is known to interconnect line replaceable units on an aircraft using a fiber optical system comprising dual symmetrical star couplers. In some cases, the line replaceable units are connected to optical star couplers via plastic optical fibers. In this manner, the signals sent by each of the line replaceable units are received by all of the other line replaceable units. Some of the line replaceable units are separated by relatively long distances.

The subject matter disclosed in detail below is directed to an optical network that enables communication between electrical components such as LRUs on an aircraft. The optical network includes a transmit star coupler and a receive star coupler, which star couplers are connected to the transmitters and receivers respectively of a plurality of optical-electrical media converters. Each optical-electrical media converter comprises a respective receiver optically coupled to the receive star coupler by way of output plastic optical fibers and a respective transmitter optically coupled to the transmit star coupler by way of input plastic optical fibers. As used herein, the term "transmit star coupler" means a star coupler in which the attached input plastic optical fibers are optically coupled to transmitters. As used herein, the term "receive star coupler" means a star coupler in which the attached output plastic optical fibers are optically coupled to receivers.

Figure 1:
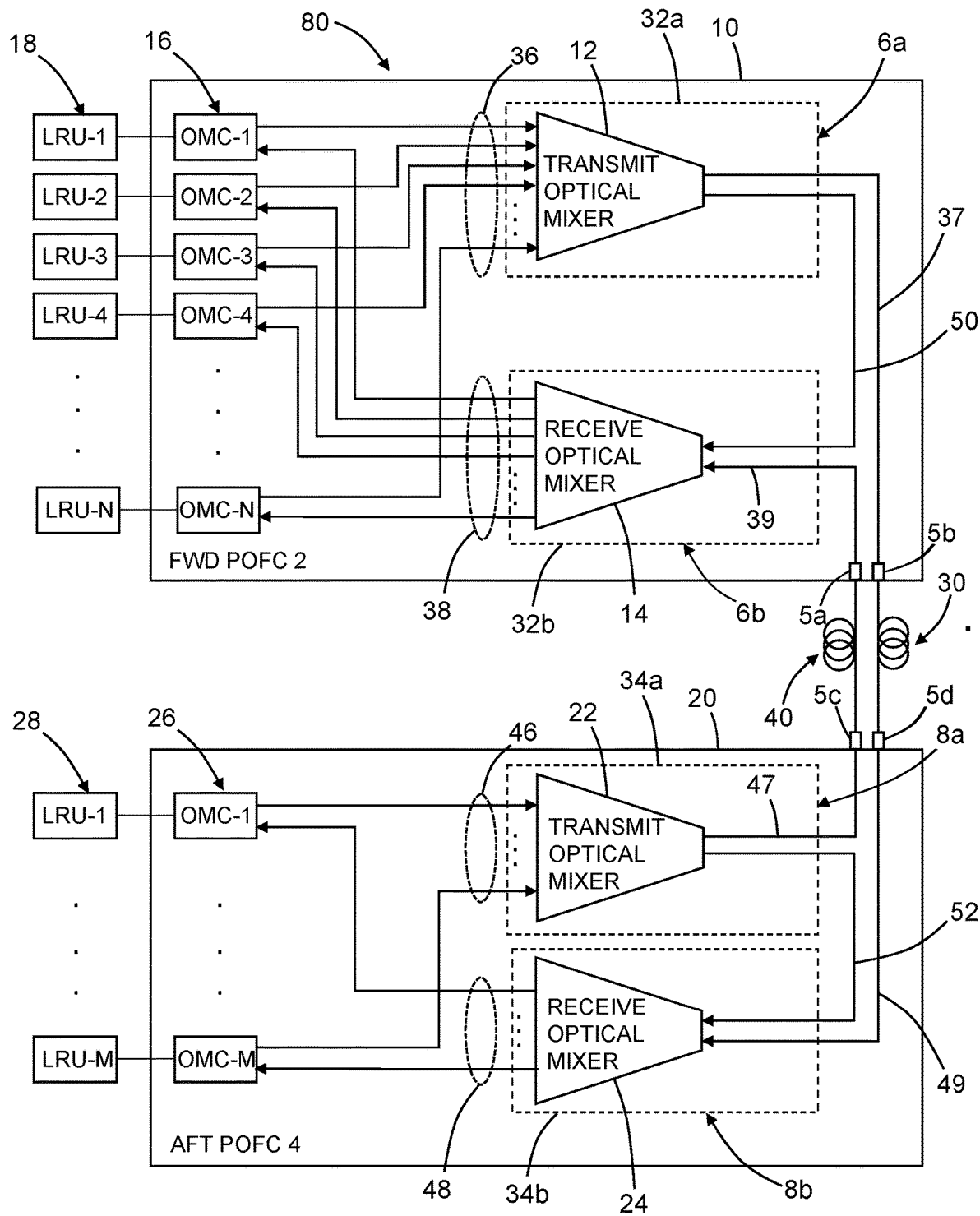
FIG. 1 is a block diagram representing some components of an avionics system that includes LRUs which may communicate with each other via an optical network that includes two star couplers in accordance with one proposed implementation for an aircraft.

FIG. 1 is a block diagram representing some components of an avionics system that includes a first plurality of LRUs 18 and a second plurality of LRUs 28 which may communicate with each other via an optical network 80 in accordance with one embodiment. The optical network 80 includes a forward POFC 2 and an aft POFC 4. The forward POFC 2 and aft POFC 4 communicate via two fiber optical paths 30 and 40.

The forward POFC 2 includes a transmit star coupler 6a consisting of a transmit optical mixer 12 inside a holding tube 32a (indicated by a dashed rectangle in FIG. 1) and a receive star coupler 6b consisting of a receive optical mixer 14 inside a holding tube 32b. The forward POFC 2 further includes a first plurality of optical-electrical media converters 16 (respectively identified as OMC-1 to OMC-N in FIG. 1, where N is a positive integer indicating the number of optical-electrical media converters in the first plurality). The first plurality of optical-electrical media converters 16 are optically coupled to the transmit optical mixer 12 and receive optical mixer 14 and electrically coupled to the first plurality of LRUs 18 (respectively identified as LRU-1 to LRU-N in FIG. 1), which are external to the forward POFC 2. More specifically, the optical-electrical media converters 16 are: (a) respectively electrically coupled to the line replaceable units 18; (b) optically coupled to transmit optical mixer 12 by way of respective POF cables 36; and (c) optically coupled to receive optical mixer 14 by way of respective POF cables 38. Each of the first plurality of optical-electrical media converters 16 comprises: (a) a respective transmitter (not shown in FIG. 1) that has a laser for converting electrical signals received from a respective line replaceable unit 18 into optical signals to be sent to transmit optical mixer 12; and (b) a respective receiver (not shown in FIG. 1) that has a photodetector that converts optical signals received from receive optical mixer 14 into electrical signals to be sent to a respective line replaceable unit 18.

The aft POFC 4 includes a transmit star coupler 8a consisting of a transmit optical mixer 22 inside a holding tube 34a (indicated by a dashed rectangle in FIG. 1) and a receive star coupler 8b consisting of a receive optical mixer 24 inside a holding tube 34b. The aft POFC 4 further includes a second plurality of optical-electrical media converters 26 (respectively identified as OMC-1 to OMC-M in FIG. 1, where M is a positive integer indicating the number of optical-electrical media converters in the second plurality) which are optically coupled to the transmit optical mixer 22 and receive optical mixer 24 and electrically coupled to the second plurality of line replaceable units 28 (respectively identified as LRU-1 to LRU-M in FIG. 1), which are external to the aft POFC 4. More specifically, the optical-electrical media converters 26 are: (a) respectively electrically coupled to the line replaceable units 28; (b) optically coupled to transmit optical mixer 22 by way of respective POF cables 46; and (c) optically coupled to receive optical mixer 24 by way of respective POF cables 48. Each of the second plurality of optical-electrical media converters 26 comprises: (a) a respective transmitter (not shown in FIG. 1) that has a laser for converting electrical signals received from a respective line replaceable unit 28 into optical signals to be sent to transmit optical mixer 22; and (b) a respective receiver (not shown in FIG. 1) that has a photodetector that converts optical signals received from receive optical mixer 24 into electrical signals to be sent to a respective line replaceable unit 28.

In accordance with the embodiments disclosed herein, the portions of POF cables 36 extending between the first plurality of optical-electrical media converters 16 and the transmit star coupler 6a are ensheathed in fire-resistant material, as will be described in more detail below. Similarly, the portions of POF cables 38 extending between the first plurality of optical-electrical media converters 16 and the receive star coupler 6b are ensheathed in fire-resistant material.

As mentioned above, the forward POFC 2 and aft POFC 4 communicate via two fiber optical paths 30 and 40. More specifically, the transmit optical mixer 12 of the transmit star coupler 6a is optically coupled to the receive optical mixer 24 of the receive star coupler 8b by way of a POF cable 37 disposed inside the housing 10, the fiber optical path 30 disposed outside and between the housings 10 and 20, and a POF cable 49 disposed inside housing 20. Similarly, the transmit optical mixer 22 of the transmit star coupler 8a is optically coupled to the receive optical mixer 14 of the receive star coupler 6b by way of the fiber optical path 40. In addition, the transmit optical mixer 12 is optically coupled to the receive optical mixer 14 by way of a POF cable 47 disposed inside the housing 20, the fiber optical path 40 disposed outside and between the housings 10 and 20, and a POF cable 39 disposed inside housing 10. The POF cable 37 is connected to the fiber optical path 30 by an optical connector 5b; the POF cable 39 is connected to the fiber optical path 40 by an optical connector 5a; the POF cable 47 is connected to the fiber optical path 40 by an optical connector 5c; and the POF cable 49 is connected to the fiber optical path 30 by an optical connector 5d. In addition, the transmit optical mixer 12 of the transmit star coupler 6a is optically coupled to the receive optical mixer 14 of the receive star coupler 6b by way of a POF cable 50, while the transmit optical mixer 22 of the transmit star coupler 8a is optically coupled to the receive optical mixer 24 of the receive star coupler 8b by way of a POF cable 52.

In accordance with the embodiments disclosed herein, portions of the POF cables 37, 39, 47 and 49 disposed outside of the star couplers are also ensheathed in fire-resistant material. More specifically, the ensheathed portions of POF cables 37, 39, 47 and 49 include the following: the portion of POF cable 37 extending from the transmit star coupler 6a to the optical connector 5b; the portion of POF cable 39 extending from the receive star coupler 6b to the optical connector 5a; the portion of POF cable 47 extending from the transmit star coupler 8a to the optical connector 5c; and the portion of POF cable 49 extending from the receive star coupler 8b to the optical connector 5d.

In the particular example embodiment depicted in FIG. 1, the transmit optical mixer 12 of the transmit star coupler 6a is configured to be connected to N POF cables 36 on one end and to two plastic optical fibers of the fiber optical paths 30 and 50 on the other end, whereas the receive optical mixer 14 of the receive star coupler 6b is configured to be connected to N POF cables 38 on one end and to two plastic optical fibers of the fiber optical paths 40 and 50 on the other end. Such optical mixers may be referred to as 2×N optical mixers. In addition, the transmit optical mixer 22 of the transmit star coupler 8a is configured to be connected to M POF cables 46 on one end and to two plastic optical fibers of the fiber optical paths 40 and 52 on the other end, whereas the receive optical mixer 24 of the receive star coupler 8b is configured to be connected to M POF cables 48 on one end and to two plastic optical fibers of the fiber optical paths 30 and 52 on the other end. Such optical mixers may be referred to as 2×M optical mixers.

In accordance with the optical network 80 depicted in FIG. 1, each signal sent by any one of line replaceable units is received by all of the other line replaceable units. For the sake of illustration, one example data communication using the optical network 80 depicted in FIG. 1 will now be described. For example, an electrical signal is sent by line replaceable unit LRU-1 to optical-electrical media converter OMC-1, which converts the electrical signal into an optical signal that is sent to transmit optical mixer 12 via one of the POF cables 36. From the transmit optical mixer 12, the optical signal is sent to receive optical mixers 14 and 24 via fiber optical paths 50 and 30 respectively. The receive optical mixer 14 receives the optical signal via fiber optical path 50 and sends that optical signal along each of the POF cables 38 to all of the optical-electrical media converters 16. Those optical signals are converted into electrical signals and sent to the line replaceable units 18. In the meantime, the receive optical mixer 24 receives the optical signal from transmit optical mixer 12 via fiber optical path 30 and sends that optical signal along each of the POF cables 48 to all of the optical-electrical media converters 26. The optical signals are converted into electrical signals and sent to the line replaceable units 28.

In accordance with one proposed implementation, the aft POFC 4 includes a housing 20 in the form of a fully enclosed metal box with no holes because the aft POFC 4 has fewer channels than the forward POFC 2 and operates without forced-air cooling at the back section of the aircraft. Therefore the aft POFC 4 has no flammability certification requirement. The forward POFC 2 also includes a housing 10 in the form of a fully enclosed metal box, but has a grid of small holes (not shown in FIG. 1) on the top and bottom faces for heat dissipation using forced-air cooling. Because of the small holes in the housing 10 of the forward POFC 2, the POF jumpers 36 used inside the forward POFC 2 are required to be protected for flammability to prevent accidental internal fire spread to adjacent LRUs in the aircraft.

In accordance with one proposed implementation, each of the forward and aft POFCs 2 and 4 is an ARINC 629 data bus LRU which provides data communication between the aircraft's operational LRUs. The operational LRUs provide command and control of many aircraft operations, such as monitoring temperature, pressure, humidity, auxiliary power, braking, tires and many other monitoring functions. The forward POFC 2 is installed in the front section of the aircraft, whereas the aft POFC 4 which is installed at the back of the aircraft.

Although FIG. 1 depicts an optical network 80 having one forward POFC and one aft POFC, in an alternative embodiment the optical network may have two forward POFCs and one aft POFC, the two forward POFCs and the aft POFC being connected by two pairs of POF cables. Each forward POFC has 20 individual optical-electrical media converters which interface with 20 LRUs in the forward section of the aircraft. The aft POFC has six individual optical media converters which interface with six LRUs at the back of the aircraft.

In accordance with one proposed implementation of a forward POFC, the POF cables 36 and 38 are located inside the metal housing 10. Each of the POF cables 36 and 38 has a PMMA acrylic plastic core, fluorinated polymer cladding, and a cross-linked polyethylene outer jacket. The POF cables 36 and 38 inside the housing 10 distribute optical signals to and from all the transmitters and receivers in the optical-electrical media converters 16. Each optical-electrical media converter 16 includes a respective printed circuit board (PCB) which is electrically connected to an LRU channel.

In accordance with the embodiments of a flammability protection process disclosed herein, a thin and flexible flammability protection tube is placed around each of the POF cables 36 and 38 enclosed by the housing 10 of the forward POFC 2. In one proposed implementation, a very thin (100 to 250 microns in wall thickness) polyimide tube is placed outside and around each embedded POF cable. The thin-walled polyimide tube does not diminish the flexibility of the POF cable.

Figure 2:
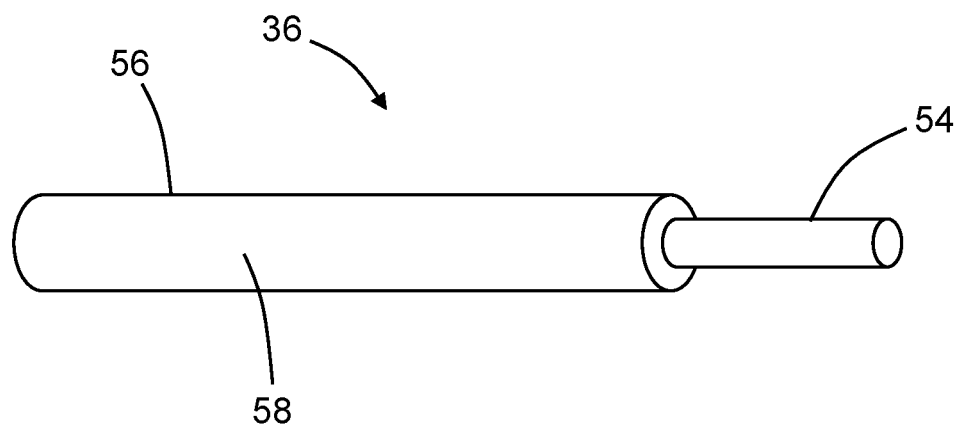
FIG. 2 is a diagram representing a three-dimensional view of a POF cable comprising a plastic optical fiber surrounded by a jacket made of electrically insulating material.

FIG. 2 is a diagram representing a three-dimensional view of a POF cable 36 comprising a plastic optical fiber 54 surrounded by a jacket 56 made of electrically insulating material (e.g., polyethylene). The jacket 56 has a circular cylindrical outer surface 58 with an outer diameter.

Figure 3:
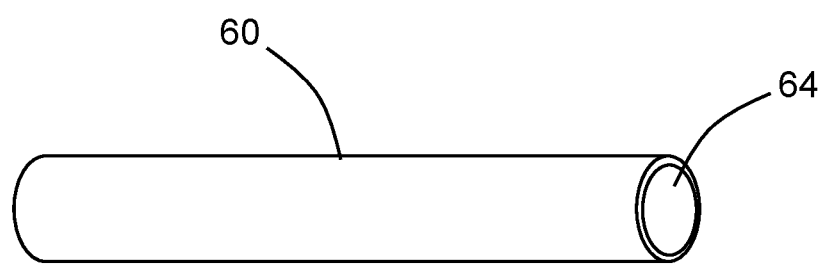
FIG. 3 is a diagram representing a three-dimensional view of a thin flexible protection tube made of flame-resistant electrically insulating material.

FIG. 3 is a diagram representing a three-dimensional view of a thin flexible protection tube 60 (hereinafter "protection tube 60") made of flame-resistant electrically insulating material. The protection tube 60 has a circular cylindrical inner surface 64 with an inner diameter that is slightly greater than the outer diameter of the jacket 56 of the POF cable 36 to allow the protection tube 60 to slide easily onto the jacket 56, thereby providing protection against burning of the POF cable 36 in the event of a fire.

This disclosure proposes methods for incorporating a thin flexible protection tube 60 on each of the POF cables 36 and 38 inside the forward POFC 2. In the case wherein the maximum outer diameter of the jacket 56 is 1.55 mm, a protection tube 60 may be selected which has an inner diameter of 1.68 mm, an outer diameter of 2.1 mm, and a wall thickness in a range of 100 to 250 microns. The dimensions of the protection tube 60 may be varied to provide flammability protection to POF cables having different outer diameters.

In accordance with one proposed implementation, the protection tube 60 is made of polyimide. Polyimide is a thermoset polymer that has superior thermal stability and chemical resistance and sufficient tensile strength. A protection tube 60 made of polyimide is lightweight, flexible, and resistant to heat and chemical interaction. Polyimide tubing is commercially available from MicroLumen, Oldsmar, Fla., U.S.A. The effectiveness of these polyimide tubes for flammability protection of the POF cables has been proven in a flammability testing laboratory.

FIGS. 4A through 4D are diagrams representing respective side views of three POF cables 36a-36c connected to a transmit star coupler 6a at respective stages of a process for providing flammability protection to embedded (enclosed) POF cables in accordance with one embodiment. This process can be applied to any number of POF cables. Only three POF cables 36a-36c are shown in FIGS. 4A-4D to avoid clutter in the drawing. The transmit star coupler 6a includes a holding tube 32a in the form of a precision metal cylinder that houses the optical components (e.g., the transmit optical mixer 12).

First, a specified length of tubing is cut to form a first protection tube 60a having a first specified length (see FIG.

4A). The first specified length is less than the length of the exposed portion (the portion external to the transmit star coupler 6a) of the POF cable 36a by a specified amount. Although not shown in FIG. 4A, second and third protection tubes (see second and third protection tubes 60b and 60c shown in FIGS. 4C and 4D) having second and third specified lengths are also cut. The second specified length is preferably less than the length of the exposed portion of the POF cable 36b, whereas the third specified length is preferably less than the length of the exposed portion of the POF cable 36c.

The protection tube 60a is then slid onto the POF cable 36a until one end of the protection tube 60a rests against the transmit star coupler 6a as depicted in FIG. 4B. An end section of the POF cable 36a protrudes from the protection tube 60a. Similarly, the second and third protection tubes 60b and 60c may be slid onto the POF cables 36b and 36c respectively. This stage is shown in FIG. 4C, which also shows a plastic optical fiber connector 62 (hereinafter "POF connector 62") being slid onto the exposed end of the POF cable 36a. The POF connector 62 is made of a suitable metal or metal alloy and has a wall thickness selected to enable crimping of the POF connector 62 to the POF cable 36a. The POF connector 62 is then crimped to the exposed end of the POF cable 36a, as shown in FIG. 4D. The protection tube 60a is now captured between the end face of the transmit star coupler 6a and the POF connector 62. The fabrication option partly depicted in FIGS. 4A-4D does not use adhesive bonding to hold the protection tube in place.

The free end of the POF connector 62 is configured to be plugged into a receptacle (not shown in the drawings) of an optical-electrical media converter 16 (see FIG. 1), thereby enabling the optical coupling of the plastic optical fiber of the POF cable 36a to a receiver of the optical-electrical media converter 16 when the forward star coupler 6 is installed inside the housing 10 of the PFOC 2.

FIG. 4D shows the completed assembly for POF cable 36a. The same four steps are repeated for each POF cable until all of the POF cables have been fitted with a respective protection tube.

FIGS. 5A through 5E are diagrams representing respective side views of three POF cables 36a-36c connected to a transmit star coupler 6a at respective stages of a process for providing flammability protection to embedded (enclosed) POF cables in accordance with another embodiment. This process can be applied to any number of POF cables. Only three POF cables 36a-36c are shown in FIGS. 5A-5E to avoid clutter in the drawing. Unlike the fabrication process depicted in FIGS. 4A-4D, the fabrication process depicted in FIGS. 5A-5E uses both adhesive bonding and crimping to hold the protection tube in place.

Figure 5A:
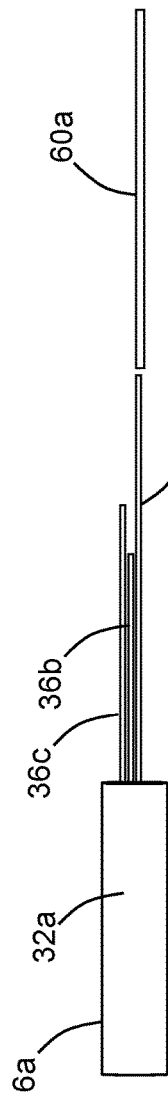
FIGS. 5A through 5E are diagrams representing respective side views of three POF cables connected to a star coupler at respective stages of a process for providing flammability protection to the POF cables in accordance with another embodiment.

First, a first protection tube 60a having a first specified length is cut (see FIG. 5A). The first specified length is less than the length of the exposed portion (the portion external to the transmit star coupler 6a) of the POF cable 36a by a specified amount. As previously described, second and third protection tubes 60b and 60c having second and third specified lengths are also cut.

Figure 5B:
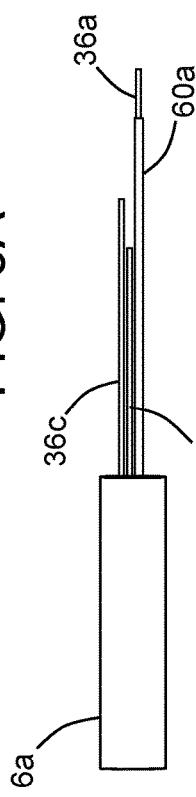
Figure 5C:
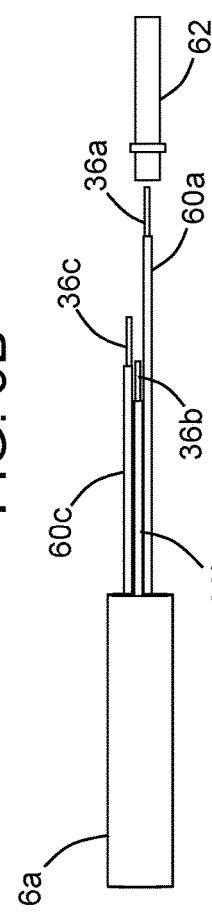

The protection tube 60a is then slid onto the POF cable 36a until one end of the protection tube 60a abuts the end face of the transmit star coupler 6a as depicted in FIG. 5B. An end section of the POF cable 36a protrudes from the protection tube 60a. Similarly, the second and third protection tubes 60b and 60c may be slid onto the POF cables 36b and 36c respectively. This stage is shown in FIG. 5C, which also shows a POF connector 62 being slid onto the exposed end of the POF cable 36a.

Figure 5D:
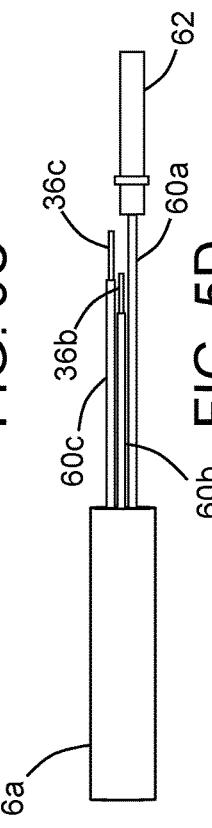

When the POF connector 62 is assembled onto the POF cable 36a, the protection tube 60a extends into the crimp region of the POF connector 62. The POF connector 62 is then crimped onto both the POF cable 36a and protection tube 60a. This stage is depicted in FIG. 5D. The crimp is located on the distal end of the POF connector 62. The protective tube 60a is between the POF connector 62 and POF cable 36a. Thus the POF connector 62 is crimped onto the POF cable 36a and the protective tube 60a is held in place by the crimp.

Figure 5E:
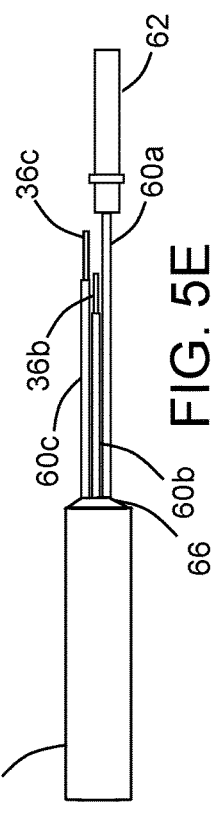

Thereafter the proximal end of the protection tube 60a is bonded to the optical fiber where the optical fiber exits the star coupler using an epoxy or room temperature-vulcanizing (RTV) adhesive 66. The polyimide tubing can be precut to length before bonding to the star coupler or cut to length after bonding. FIG. 5E shows the completed assembly for the POF cable 36a. One end of the protection tube 60a is bonded to the transmit star coupler 6a and the other end of the protection tube 60a is crimped between the POF connector 62 and the POF cable 36a.

The same five steps described above may be repeated for each POF cable until all of the POF cables 36 and 38 inside the forward POFC 2 have been fitted with a respective flame-proof protection tube. Optionally, the same five steps described above may be repeated for each POF cable until all of the POF cables 46 and 48 inside the aft POFC 4 have been fitted with a respective flame-proof protection tube.

The free end of the POF connector 62 is configured to be plugged into a receptacle (not shown in the drawings) of an optical-electrical media converter 16 (see FIG. 1), thereby enabling the optical coupling of the plastic optical fiber of the POF cable 36a to a receiver of the optical-electrical media converter 16 when the forward star couplers 6a and 6b are installed inside the housing 10 of the forward POFC 2.

Figure 6:
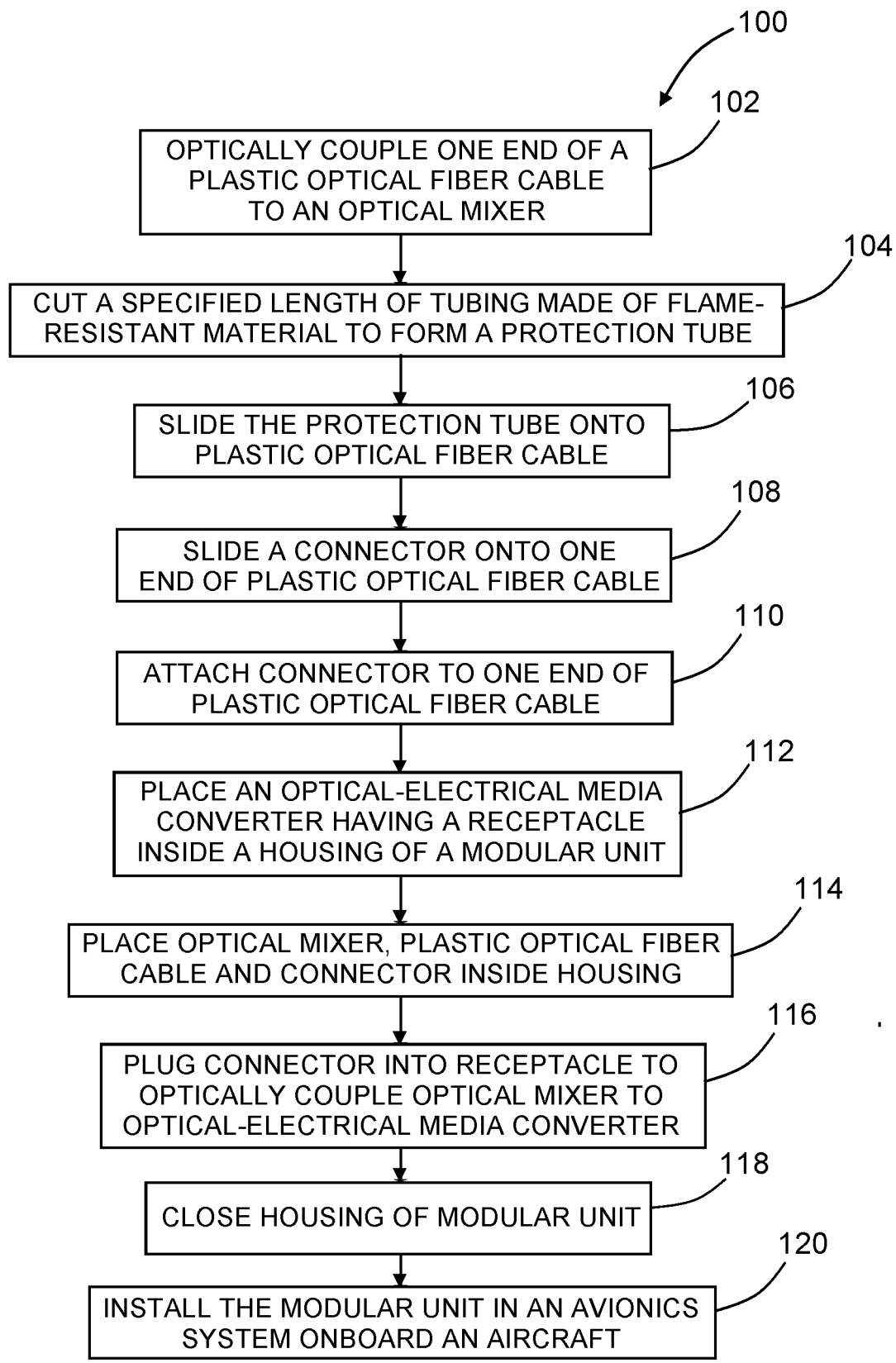
FIG. 6 is a flowchart identifying steps of a method 100 for providing flammability protection to plastic optical fiber in an avionics systems onboard an aircraft.

The above-disclosed techniques and processes for flammability protection of POF cable without using heavy and bulky protection jackets is especially suitability for use in avionics systems onboard aircraft. FIG. 6 is a flowchart identifying steps of a method 100 for providing flammability protection to plastic optical fiber in an avionics systems onboard an aircraft. First, one end of a POF cable is optically coupled to an optical mixer (step 102). Then a specified length of tubing made of flame-resistant material is cut to form a protection tube (step 104). The protection tube is then slid onto the POF cable (step 106). After step 106 has been performed, a connector is slid onto another end of the POF cable (step 108). The connector is then attached to the other end of the POF cable (step 110). Before or after the assembly of the optical mixer, POF cable, protection tube and connector, an optical-electrical media converter having a receptacle is placed inside a housing of a modular unit (step 112). After step 112 has been performed, the optical mixer, plastic optical fiber cable (ensheathed by the protection tube) and connector are placed inside the housing (step 114). Then the connector is plugged into the receptacle to optically couple the optical mixer to the optical-electrical media converter (step 116). The housing of the modular unit is closed (step 118) after all of the components (e.g., optical-electrical media converters, optical mixers, plastic optical fiber cables and connectors) have been placed inside. Then the modular unit is installed in an avionics system onboard an aircraft (step 120).

Figure 7:
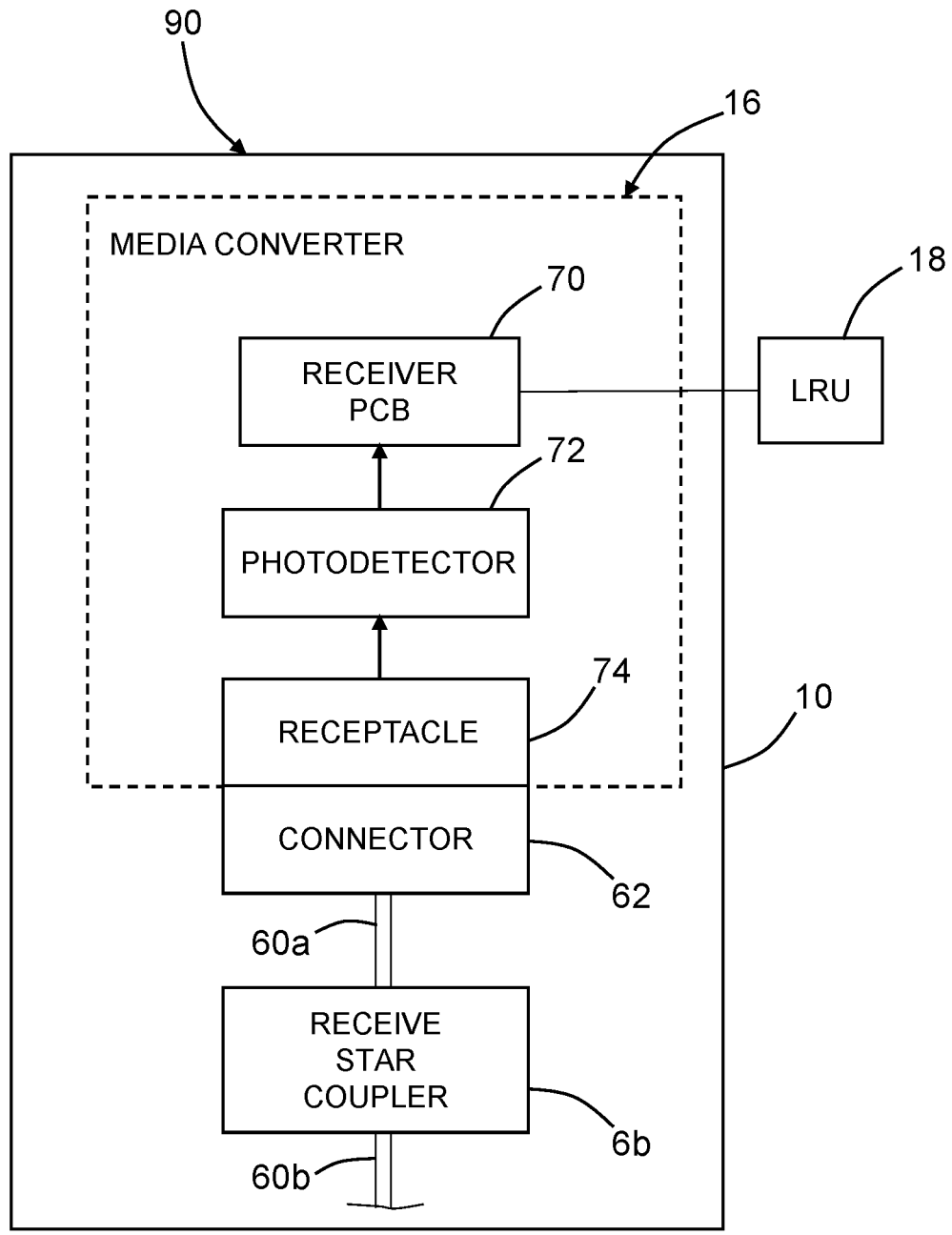
FIG. 7 is a block diagram identifying some components of a modular unit which may be installed on an aircraft as part of an avionics system.

FIG. 7 is a block diagram identifying some components of a modular unit 90 which may be installed on an aircraft as part of an avionics system. 18. The modular component includes a housing 10 and the following components installed inside the housing 10: an optical-electrical media converter 16, a receive star coupler 6b, and a plastic optical fiber cable (not visible in FIG. 7) ensheathed by a protection tube 60a. The plastic optical fiber cable ensheathed in protection tube 60a optically couples the receive star coupler 6b to the optical-electrical media converter 16 inside the housing 10. Although not shown in FIG. 7, the modular component 90 may also include a transmit star coupler that is optically coupled to the optical-electrical media converter 16.

The POF cable ensheathed by protection tube 60a comprises a plastic optical fiber and a jacket that ensheathes the plastic optical fiber. The protection tube 60a that ensheathes the jacket of the plastic optical fiber cable is made of a flame-resistant material (e.g., polyimide). Although not shown in FIG. 7, the receive star coupler 6b may have a first multiplicity of POF cables ensheathed in respective protection tubes 60a connected to one side and a multiplicity of POF cables ensheathed in respective protection tubes 60b (only one of which is shown in FIG. 7) connected to the other side.

The optical-electrical media converter 16 includes a receptacle 74, a photodetector 72 and a receiver printed circuit board (PCB) 70 that is electrically coupled to an LRU 18 which is external to the housing 10. Although not shown in FIG. 7, the optical-electrical media converter 16 may also include another receptacle, a laser device and a transmitter PCB that is also electrically coupled to the LRU 18.

As seen in FIG. 7, the modular unit 90 further includes a POF connector 62 that is mechanically coupled to (e.g., plugged into) the receptacle 74 to optically couple the receive star coupler 6b to the photodetector 72 of the optical-electrical media converter 16 via the POF cable. Although not shown in FIG. 7, the modular component 90 may also include another connector that is mechanically coupled to (e.g., plugged into) another receptacle to optically couple a transmit star coupler to a laser device of the optical-electrical media converter 16 via another POF cable.

While methods and devices for providing embedded POF with flammability protection have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for assembling a modular component, the method comprising:
   attaching an optical connector to a housing;
   installing a star coupler inside the housing;
   installing an optical-electrical media converter inside the housing;
   cutting a first specified length of tubing having an inner circular cylindrical surface and made of flame-resistant material to form a first protection tube;
   cutting a second specified length of tubing having an inner circular cylindrical surface and made of flame-resistant material to form a second protection tube;
   sliding the first protection tube onto a first plastic optical fiber cable comprising a single plastic optical fiber and a jacket that ensheathes the plastic optical fiber;
   sliding the second protection tube onto a second plastic optical fiber cable comprising a single plastic optical fiber and a jacket that ensheathes the plastic optical fiber;
   optically coupling the optical-electrical media converter to the star coupler by means of the first plastic optical fiber cable ensheathed by the first protection tube; and
   optically coupling the star coupler to the optical connector by means of the second plastic optical fiber cable ensheathed by the second protection tube.

2. The method as recited in claim 1, wherein optically coupling the star coupler to the optical connector comprises crimping the optical connector onto the one end of the plastic optical fiber cable.

3. The method as recited in claim 1, wherein optically coupling the star coupler to the optical connector comprises crimping the optical connector onto the second protection tube.

4. The method as recited in claim 1, optically coupling the optical-electrical media converter to the star coupler comprises bonding one end of the first protection tube to the star coupler using epoxy or room temperature-vulcanizing adhesive.

5. The method as recited in claim 1, further comprising:
   closing the housing of the modular unit after the optical-electrical media converter, star coupler, first and second plastic optical fiber cables, and optical connector have been placed inside; and
   installing the modular unit in an avionics system onboard an aircraft.

6. A modular component comprising:
   a housing;
   an optical connector attached to the housing;
   an optical-electrical media converter installed inside the housing, the optical-electrical media converter comprising a receptacle;
   a star coupler installed inside the housing;
   a first plastic optical fiber cable comprising a single plastic optical fiber and a jacket that ensheathes the plastic optical fiber and has an outer diameter, the first plastic optical fiber being connected to optically couple the star coupler to the optical-electrical media converter inside the housing;
   a second plastic optical fiber cable comprising a single plastic optical fiber and a jacket that ensheathes the plastic optical fiber and has an outer diameter, the second plastic optical fiber being connected to optically couple the star coupler to the optical connector;
   a first protection tube that ensheathes the jacket of the first plastic optical fiber cable and a second protection tube that ensheathes the jacket of the second plastic optical fiber cable, wherein each of the first and second protection tubes is made of a flame-resistant material, has an inner circular cylindrical surface with an inner diameter that is greater than the outer diameter of the jacket, and has one end that rests against the star coupler.

7. The modular component as recited in claim 6, wherein the flame-resistant material is polyimide.

8. The modular component as recited in claim 6, wherein each of the first and second protection tubes is flexible and has a wall thickness in a range of 100 to 250 microns.

9. The modular component as recited in claim 6, wherein the optical connector is crimped to the second plastic optical fiber cable.

10. The modular component as recited in claim 6, wherein the optical connector is crimped to the protection tube over the jacket and the one end of the protection tube is bonded to the star coupler.

11. A modular component comprising:
a housing;
first and second optical connectors attached to the housing;
an optical-electrical media converter installed inside the housing;
a transmit star coupler installed inside the housing and comprising a transmit optical mixer;
a receive star coupler installed inside the housing and comprising a receive optical mixer;
a first plastic optical fiber cable which is connected to optically couple the transmit optical mixer to the optical-electrical media converter;
a second plastic optical fiber cable which is connected to optically couple the receive optical mixer to the optical-electrical media converter;
a third plastic optical fiber cable which is connected to optically couple the transmit optical mixer to the first optical connector;
a fourth plastic optical fiber cable which is connected to optically couple the receive optical mixer to the second optical connector, wherein each of the first through fourth plastic optical fiber cables is installed inside the housing and comprises a single plastic optical fiber and a jacket that ensheathes the plastic optical fiber and has an outer diameter;
first through fourth protection tubes that respectively ensheathe the jacket of the first through fourth plastic optical fiber cables, wherein each of the first through fourth protection tubes is made of a flame-resistant material and has an inner circular cylindrical surface with an inner diameter that is greater than the outer diameter of the jacket.

12. The system recited in claim 11, wherein each protection tube is flexible and has a wall thickness in a range of 100 to 250 microns.

13. The system recited in claim 11, wherein the flame-resistant material is polyimide.

14. The system recited in claim 11, wherein the first optical connector is crimped to one end of the third plastic optical fiber cable and one end of the third protection tube is bonded to the transmit optical mixer.

15. The system recited in claim 11, wherein the first optical connector is crimped to the third protection tube over the jacket.

16. The system recited in claim 11, further comprising a line replaceable unit that is electrically coupled to the optical-electrical media converter.

\* \* \* \* \*